US007921980B2

(12) United States Patent
Eder et al.

(10) Patent No.: US 7,921,980 B2
(45) Date of Patent: Apr. 12, 2011

(54) DEVICE AND METHOD FOR VERTICAL ADJUSTMENT IN CONTAINER PROCESSING MACHINES

(75) Inventors: Erich Eder, Donaustauf (DE); Heinz Humele, Thalmassing (DE); Wolfgang Roidl, Deuerling (DE)

(73) Assignee: Krones AG, Neutraubling (DE)

( * ) Notice: Subject to any disclaimer, the term of this patent is extended or adjusted under 35 U.S.C. 154(b) by 213 days.

(21) Appl. No.: 12/064,841

(22) PCT Filed: Jul. 8, 2006

(86) PCT No.: PCT/EP2006/006707
§ 371 (c)(1),
(2), (4) Date: May 9, 2008

(87) PCT Pub. No.: WO2007/025602
PCT Pub. Date: Mar. 8, 2007

(65) Prior Publication Data
US 2009/0014281 A1        Jan. 15, 2009

(30) Foreign Application Priority Data

Aug. 30, 2005    (DE) .................. 10 2005 041 120

(51) Int. Cl.
*B65G 47/86*    (2006.01)
(52) U.S. Cl. .................. 198/379; 198/377.01
(58) Field of Classification Search .................. 198/379, 198/377.01, 377.02, 377.06, 377.07, 377.1
See application file for complete search history.

(56) References Cited

U.S. PATENT DOCUMENTS

| | | | | |
|---|---|---|---|---|
| 3,771,284 A | * | 11/1973 | Boeckmann et al. | ........... 53/282 |
| 3,990,316 A | | 11/1976 | Risi | |
| 4,280,612 A | * | 7/1981 | Nagano | ................ 198/379 |
| 5,150,782 A | * | 9/1992 | Richter | ................ 198/379 |
| 5,165,551 A | * | 11/1992 | Frost | ................ 198/379 |
| 5,398,485 A | * | 3/1995 | Osifchin | ............. 198/803.14 |
| 5,816,029 A | | 10/1998 | Sweeny | |
| 6,279,722 B1 | | 8/2001 | Bankuty et al. | |
| 6,321,812 B1 | * | 11/2001 | Kral | ............. 198/377.01 |
| 6,848,564 B2 | * | 2/2005 | Nickey et al. | ................ 198/379 |

(Continued)

FOREIGN PATENT DOCUMENTS

DE    41 31 699 A1    3/1993

(Continued)

OTHER PUBLICATIONS

International Search Report base on International Patent Application No. PCT/EP2006/006707; Filed Jul. 8, 2006; Date of Mailing—Jan. 17, 2007.

(Continued)

*Primary Examiner* — James R Bidwell
(74) *Attorney, Agent, or Firm* — Marshall, Gerstein & Borun LLP

(57) ABSTRACT

A device for processing containers with a lip on container support units arranged at regular intervals on a support frame and having at least a container support and a container dish, with the distance from the container support unit to a conveyance plane being changed through variation of the overall height of the container support unit. Also, a method for labeling containers with a support ring, with multiple container support units arranged at regular intervals on the rotating support frame, the container support units having at least a container support and a container dish, with the containers being at least partially clamped between a container support unit and a centering bell during their conveyance through a processing track, and with the distance from a transport plane to the container support unit being varied by changing the overall height of the container support unit according to the size of the containers to be processed.

67 Claims, 7 Drawing Sheets

U.S. PATENT DOCUMENTS 6,973,761 B2 * 12/2005 Peronek .................. 53/331.5

FOREIGN PATENT DOCUMENTS

| EP | 0 487 020 A1 | 11/1991 |
| EP | 1 264 771 BI | 5/2002 |
| WO | WO 2007/025602 A1 | 3/2001 |
| WO | WO 2004/014779 A1 | 2/2004 |

OTHER PUBLICATIONS

International Search Report based on International Patent Application No. PCT/EP2006/006707; Filed Jul. 8, 2006; Date of Mailing—Apr. 17, 2008.

* cited by examiner

DEVICE AND METHOD FOR VERTICAL ADJUSTMENT IN CONTAINER PROCESSING MACHINES

CROSS REFERENCE TO RELATED APPLICATIONS

The present application claims the benefit of priority of International Patent Application No. PCT/EP2006/006707, filed on Jul. 8, 2006, which application claims priority of German Patent Application No. 10 2005 041 120, filed Aug. 30, 2005. The entire text of the priority application is incorporated herein by reference in its entirety.

FIELD OF THE DISCLOSURE

The disclosure concerns a device for processing containers, a container support unit, a method for labeling containers, and a container conveyance device, as used in the beverage bottling industry.

BACKGROUND

Such devices for processing of containers are used mainly in the food processing industry, particularly in the beverage processing industry. The processing of containers involves for instance filling or emptying thereof, but is mainly understood to entail labeling of containers. The containers processed are primarily containers with lips, i.e. cans, bottles or the like, with the processing of PET bottles being carried out most frequently in such machines. The present device and method thus preferably deal with the labeling of plastic, especially PET, containers.

EP 1 264 771 for example presents a container processing device which can be configured so as to allow processing of containers of different heights. This involves a machine for labeling containers with an input star wheel, a rotating container table on which the processing takes place, and an output star wheel. The fact of being able to process containers of different height on one and the same machine is achieved in that the rotating bottle table is made vertically adjustable.

A disadvantage of this approach is that the vertical adjustment of the bottle table carries a very high implementation cost.

SUMMARY OF THE DISCLOSURE

It is thus an object of the present disclosure to provide a container processing device and method, a support unit, and a container conveyance device, with the help of which it becomes possible to process containers of different heights on one and the same machine in a simple fashion, minimizing the implementation costs.

The device is implemented in that the distance from a container support unit to a conveyance plane is changeable based on variation in the overall height of the container support unit. A conveyance plane here is that plane in which the lip of the containers to be processed moves throughout the conveyance process. This conveyance plane is furthermore made substantially parallel to a support frame, on which the container support units are located.

The container support unit is preferably fashioned such that it comprises at least a container support and a container dish. According to an embodiment of the disclosure, the variation in the overall height of the container support unit is achieved in that spacers can be installed between the container support and the container dish. These spacers can have the same diameter as the, container support or container dish, but it is also conceivable to insert spacers with a smaller diameter between the two parts. The spacers can either be rigidly anchored between the container support and the container dish, which can be achieved for instance by means of a bolted connection, or they can be secured by means of a quick release or snap fit connection.

According to another embodiment of the device, it is conceivable to employ container supports of different heights in order to vary the overall height of the container support unit. When the container height changes, it would then be necessary to remove the container support from the support frame and install a container support of a different height into the support frame.

Especially preferable is an embodiment of the disclosure wherein container dishes of different height can be placed on the container support. In this case, there is no need to change out the entire container support, which would remain here rigidly anchored in the support frame, but rather another container dish simply needs to be placed onto the container support. This embodiment has the advantage of providing a very simple construction, since the container dish in itself is a readily accessible and easily exchangeable part.

According to a preferred elaboration of the disclosure, the container support unit additionally comprises a container centering means. The container centering means centers the container on the container dish in order to enable or optimize processing. This element is designed such that it at least partially grips the contour of the container to be processed. The container centering means is a component that needs to be changed out for nearly every container change, since it needs to conform to the container shape and/or container size. A preferred embodiment of the disclosure thus consists in having the component that is to be exchanged anyhow be modified in such a way that an exchange would allow not only other container contours or shapes to be processed, but also different container heights. To this end, the height of the component changes along with the actual centering surface. This makes it possible to vary the criteria of container diameter, container shape and container height by exchanging one component. The container centering means can be joined to the container dish rigidly with bolts as well as in readily detachable fashion by means of quick release connections.

A further embodiment of the disclosure consists in that the variation in the overall height of the container support unit is accomplished by exchanging not just one but several components. Thus, it is conceivable for instance for both the container dish and the container centering means to be exchanged. This makes it possible to save on format parts, for instance, if the exchanged container dish provides only part of the height to be varied and the container centering means, which needs to be exchanged most of the time anyhow and is thus an indispensable component, compensates for the rest of the height.

A preferred elaboration of the disclosure is configured such that container feed to the processing device is provided by an input star wheel, and container removal from the device is provided by an output star wheel. The star wheels are preferably equipped with grippers that are able to grasp the containers in clamping fashion.

According to a further preferred elaboration of the disclosure, the containers are bottles with a lip, preferably plastic bottles, and even more preferably PET bottles. Plastic or PET bottles comprise this lip to ensure optimal handling of the containers. Preferably, the grippers of the input and output star wheels are formed such that they can grip plastic or PET bottles by clamping onto the lip. This gripping can be carried out both above and below the lip.

A preferred elaboration of the disclosure consists in that the containers are held clamped from above and below during their processing by the container support unit and a centering bell. It is advantageous to this end if both the container support unit and the centering bell can be moved up and down in the direction of the longitudinal axis of the container support unit. Preferably, this movement is carried out by means of a lifting cam in conjunction with a roller. An alternative embodiment consists in the use of cylinders, such as pneumatic or hydraulic cylinders for lifting and lowering the container support unit and centering bell.

If the processing involves a labeling process and/or an inspection process, then it is advantageous for the container support unit to be arranged rotatably about its longitudinal axis in the support frame. This would allow one to perform all-around labeling and/or inspection tasks which involve the entire bottle circumference.

For this, it is necessary that the desired rotational movement be transmitted to the container support unit. As a means of transmitting such rotational movement, a gear is preferably provided, which is secured to the container support unit and accepts energy for instance from a toothed belt. Alternatively, it is for example conceivable for the rotational movement to be transmitted to the container support unit by a servo motor, whereby preferably each container support unit has its own servo motor. This is of advantage particularly when so-called shaped containers are processed, which need to be positioned in precise alignment. Here, a program-controlled servo motor can provide exactly the right rotational position in which the processing needs to take place.

According to a further preferred elaboration of the disclosure, each container support comprises centering elements which can accept mating pieces which are attached to components that need to be accepted by the container support. These mating pieces can be attached to the container dishes as well as to the spacers which can be inserted between the container dishes and the container support units.

To be able to provide for the processing of shaped containers in this case, the centering elements are arranged in the container support in such a way that a unique positioning of the container dishes on the container supports with is ensured with respect to their circumferential position. Such a centering element and mating piece can respectively be formed as a pin and a recess.

The object as concerns the container support unit is achieved in that the container support unit is variable in its overall height. According to an embodiment of the disclosure, the overall height is varied by allowing spacers to be placed between the container support and the container dish. It is conceivable here for the spacers to be rigidly anchored to the container support, for instance by means of a bolt, but it is also conceivable for the spacers to be secured by being clamped between the container support and container dish.

According to a preferred embodiment of the disclosure, the overall height of the container support unit is varied by placing container dishes of different height onto the container supports. These are secured to the container support preferably by means of a quick release connection, such as a bayonet joint.

According to a preferred elaboration of the disclosure, the container support unit comprises at least one container support, one container dish and one container centering means, whereby the container centering means at least partially embraces the contour of the container. The container centering means is preferably fashioned such that at least a small recessed portion is provided in which the container to be processed can sit, securing it against radial displacement.

A further possibility for changing the overall height of the container support unit is allowing container centering means of different height to be placed on the container dishes. A further preferred embodiment consists in that both the container dish and the container centering means are available with different heights, so as to be able to accommodate different container heights as flexibly as possible. Here, it is preferable to be able to create arbitrary combinations between container dishes of different height and container centering means of different height.

A further embodiment of the container support unit consists in that the overall height can be varied by placing multiple container dishes on top of each other.

To allow the greatest number of containers with the most varied contours to be processed, a preferred elaboration of the disclosure consists in that each container support comprises at least one centering element which can accept a mating piece, whereby the mating piece can be attached to a spacer, a container dish or a container centering means. Preferably, the centering elements and the mating pieces are arranged such that the container dishes, the spacers or the container centering means can be secured to the container support in a manner dependent on the rotational position. Preferably, at least one component, such as the container support, container dish, spacer or container centering means, comprises a securing mechanism that protects the aforesaid components, when joined, from unintended detachment.

According to a preferred elaboration of the disclosure, the securing mechanism is located on the container support. It is preferably fashioned as a quick release connection to allow problem-free and/or quick detachment of the aforementioned components. The securing mechanism can be for instance a bayonet joint or a snap fit joint. Other joining mechanisms are of course also imaginable. In a preferred elaboration of the disclosure, the container support unit comprises a means for transmitting rotational movement to the container support unit. The means preferably involves a gear, which puts the container support and thus also the container support unit into rotation upon engaging with a toothed belt. The rotation can however also be generated by a servo motor, in which case each container support preferably has its own servo motor.

According to a further preferred elaboration of the disclosure, the container support unit comprises a lifting element which makes it possible to move the container support unit up or down perpendicular to the conveyance plane. In a further embodiment, the lifting element is comprised of a cam roller and a lifting cam, it being also possible to construct the lifting element by installing a cylinder, such as a pneumatic or hydraulic cylinder.

According to a preferred elaboration of the disclosure, the container support unit just described is employed in a device for labeling containers. Such a labeling device is described in the preceding paragraphs.

The object as concerns the method for labeling containers is achieved in that the distance from the conveyance plane to the container support unit is varied by changing the overall height of the container support unit according to the size of the containers to be processed, the distance being preferably changed by exchanging the container dishes. According to a further elaboration of the disclosure, the distance from the conveyance plane to the container support unit is varied by exchanging the container support. It is also possible to exchange the whole container support unit in order to vary the height.

A further elaboration of the disclosure consists in that the method is designed such that spacers are inserted between the container support and the container dish to vary the height between the container support unit and the conveyance plane.

It is furthermore possible to place at least one spacer on the container dish rather than inserting it between the container dish and the container support. This variation is simpler in terms of handling, since only one spacer needs to be placed onto the substructure each time, while when inserting spacers between parts of the container support unit, pre-processing such as removal of the container dish from the container support is always necessary.

The containers are preferably clamped while they are being processed between the container support unit and a centering bell located above the container. To effect this clamping, both the container support unit and the centering bell can be moved along the longitudinal axis of the container support unit upward and downward.

The clamping of the container to be processed between the container support unit and the centering bell is preferably effected in such a way that the container is fed by a container feed means to the support frame with the container support units and centering bells secured thereon. The feeding takes place here in such a way that the container to be processed is introduced between the container support unit and the centering bell, whereby the top edge of the container support unit is located under the bottom of the container to be processed and the centering bell is located above the mouth of the container to be processed. After introducing the container between the container support unit and the centering bell, the container support unit is moved upward with respect to the longitudinal axis of the container support unit and the centering bell is moved downward with respect to the longitudinal axis of the container support unit, until the container is held clamped. The container feed means can then release the container, before it moves about its longitudinal axis turning along the processing track. At the end of the processing track, the container is transferred to the container removal means which removes it from the processing machine. The transfer of the container being processed from the processing track to the container removal means preferably takes place in such a way that the container removal means grips the container in clamping fashion at least over a portion of its circumference while the container is still being held clamped by the container support unit and the centering bell. The centering bell and container support unit are then moved away upward and downward respectively along the longitudinal axis of the container support unit, so that the container is now gripped in clamping fashion by just the container removal means. Removal of the processed container can then take place.

According to a preferred elaboration of the disclosure, the containers to be processed are plastic containers, preferably PET bottles with a lip. The container feed means and container removal means are preferably an input and output star wheels, which are equipped with clamps for the pose of gripping the plastic bottles by the lip.

The plastic bottles are preferably moved by the processing device in such a way that the lip always moves in the conveyance plane, which is located parallel to the support frame. Such an arrangement has the advantage that the container feed means and container removal means do not need to be repositioned vertically despite the different heights of containers being processed in the processing machine. The lip is thus always located in the conveyance plane independently of the bottle height.

According to a preferred elaboration of the disclosure, the containers are transferred by a container conveyance device to the input star wheel. This method has the advantage that the containers in the container conveyance device are constantly located at the same separation distance, whereby the can be easily transferred to the input star wheel, then to the processing track, and from there to the output star wheel. A method is however also conceivable, whereby the containers to be processed are transferred directly to the processing track from the container conveyance device.

Different methods of transfer are conceivable also in the output section of the processing machine. It is thus conceivable to transfer the containers from the processing track to the output star wheel and further onto a container conveyance device, as is the possibility of transferring the container to be processed from the processing track directly onto a container conveyance device.

The object as concerns the container conveyance device is achieved in that the device comprises stabilizers which can be brought into engagement with a guide track in a transfer section.

According to a preferred elaboration of the disclosure, the stabilizers constitute pins which engage with a guide groove of the guide track. Other stabilizers are however also conceivable.

The container conveyance device is preferably constituted by a chain, comprising elements with which the containers to be conveyed can be held, the elements being preferably gripping clamps which preferably grip the containers by their lips. Certainly, other methods of gripping are also conceivable, such as for instance body grippers or in-mouth grippers.

The pins which engage the guide groove of the guide track are preferably attached to the top side of the grippers, with attachment of the pins to the bottom side of the grippers being also conceivable. The guide track needs to be arranged above or below the grippers accordingly.

A further configuration possibility is to attach the stabilizers not to the gripper but to the chain.

According to a preferred elaboration of the disclosure, the guide track comprises supporting elements that stabilize the grippers in the transfer section in such a way that precise transfer of containers can be take place. Stabilization is necessary because chains normally have play, which makes precise transfer difficult.

The container conveyance device is preferably arranged in such a way that it either transfers the containers in the transfer section onto an input star wheel or directly onto the processing track, or in such a way that the processing track or output star wheel can transfer the containers in the transfer section onto the container conveyance device.

BRIEF DESCRIPTION OF THE DRAWINGS

A particularly preferable embodiment example is explained below with the aid of the drawings. The drawings show.

DETAILED DESCRIPTION OF THE PREFERRED EMBODIMENT

Figure 1:
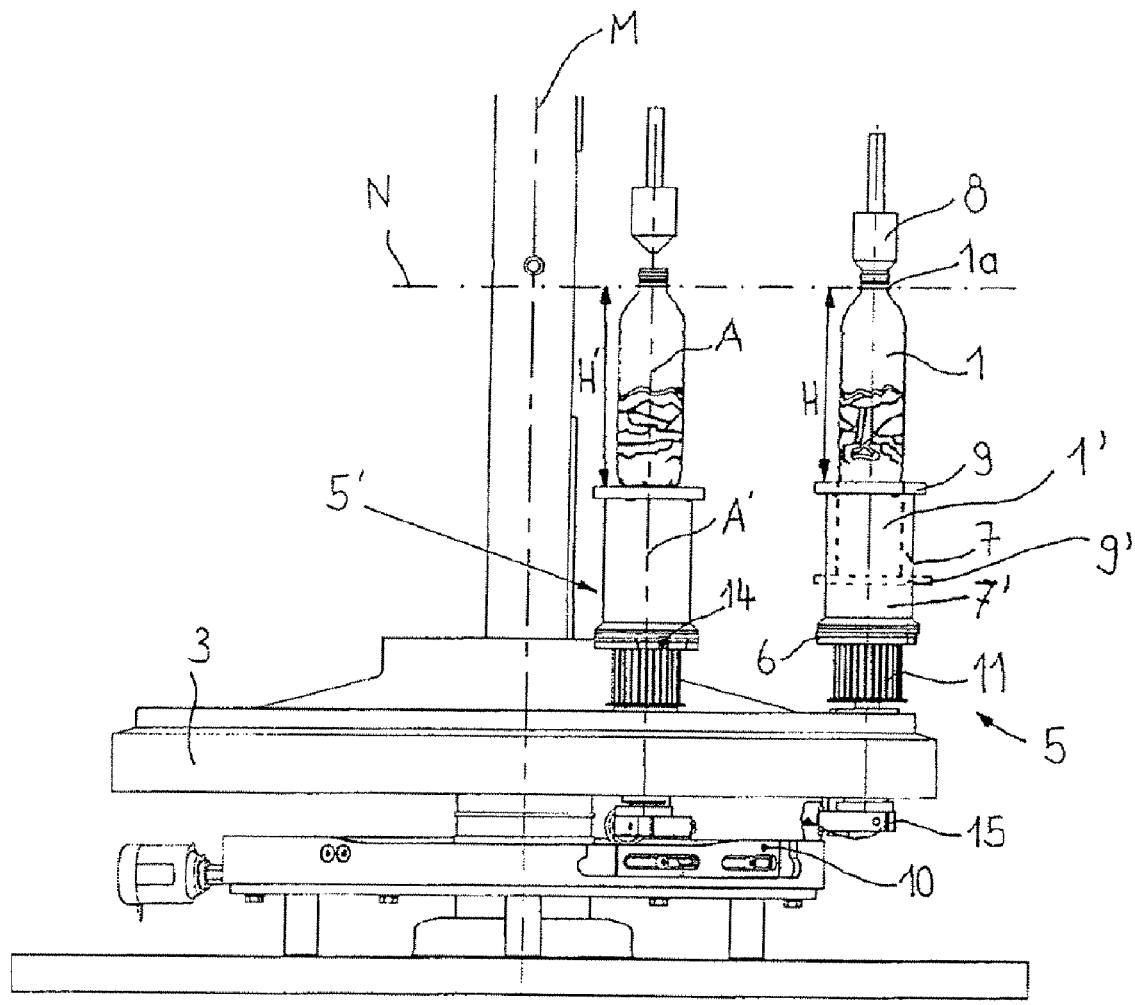
FIG. 1 a side view of a bottle table of a labeling device.

FIG. 1 shows a portion of a container labeling machine. A round support frame 3 which turns about a machine axis M can be seen, at the circumference of which container support units 5 are attached at regular intervals, being mounted rotatably in the support frame 3. The longitudinal axes of the container support units A' are positioned here parallel to the machine axis M. For the sake of clarity, only two container support units 5 are shown in FIG. 1. On the projection of the longitudinal axis of the container support unit A' above the container support unit 5 is located a centering bell 8, which is attached to a machine frame not illustrated here.

Both the container support unit 5 and the centering bell 8 are attached in vertically moveable fashion in such a way as to allow upward and downward movement along the longitudinal axis of the container support unit A'.

The container support units 5 each consist of container support 6, a container dish 7, a container centering means 9, a gear 11 for transmission of rotational movement and a lifting element 15 which conducts or transmits the upward and downward movement with respect to the longitudinal axis of the container support unit A'.

In the sections of the processing track where the container 1 needs to be rotated, a toothed belt, which is not illustrated here, engages the gear 11 and thereby puts the container support unit into rotational movement. The lifting element 15, which is located here below the support frame, comprises a roller, which engages a lifting cam 10. The lifting cam 10 comprises notches and prominences, so that the rollers of the lifting element 15 run along these notches and prominences as they move along the lifting cam 10, thereby allowing lifting or lowering movement of the container support units along the longitudinal axis of the container support units A' to be made. The lifting element 15 of the container support unit 5' is located in a recess of the lifting cam 10, so that the distance H' from the top edge of the container dish 7 of the container support unit 5' to a conveyance plane N is greater than the distance H from the top edge of the container dish 7 of container support unit 5 to the conveyance plane N.

A rotationally symmetrical container 1 is located on the container support unit 5, being clamped concentrically between the container dish 7 and the centering bell 8.

FIG. 1 also shows, in dashed lines, a container dish 7' with its container centering means 9' and a container 1 located thereon. This smaller container dish 7' is placed onto a container support 6 when taller containers 1 are processed in the device according to FIG. 1.

Parallel to the support frame 3 above the container support units 5, 5' is located the conveyance plane N, in which the lips 1 a of the containers 1 are located throughout the conveyance of the containers 1 through the processing device.

FIG. 2 shows a container support unit 5 as secured in the support frame 3 according to FIG. 1. It comprises a lifting element 15 consisting of a roller and a crossbar 31, this element being attached to a bearing unit 32 which in turn is supported on the support frame 3, not illustrated here. Over the bearing unit 32 and concentric thereto is located a gear 11, which is installed for transmission of rotational movement. Further above the gear and concentric thereto is located a container support 6, onto which the container dish 7 is placed, likewise concentrically. The container dish 7 and container support 6 are connected to each other by a securing means, not shown here, in such a way that unintended separation is not possible. The securement is actuated by means of a securing mechanism 14, which in this case is a lever. A container centering means 9 is installed concentrically to the container dish 7, comprising a section that tapers toward the container dish 7 and in which a container 1 can be accommodated in centered fashion.

Figure 2A:
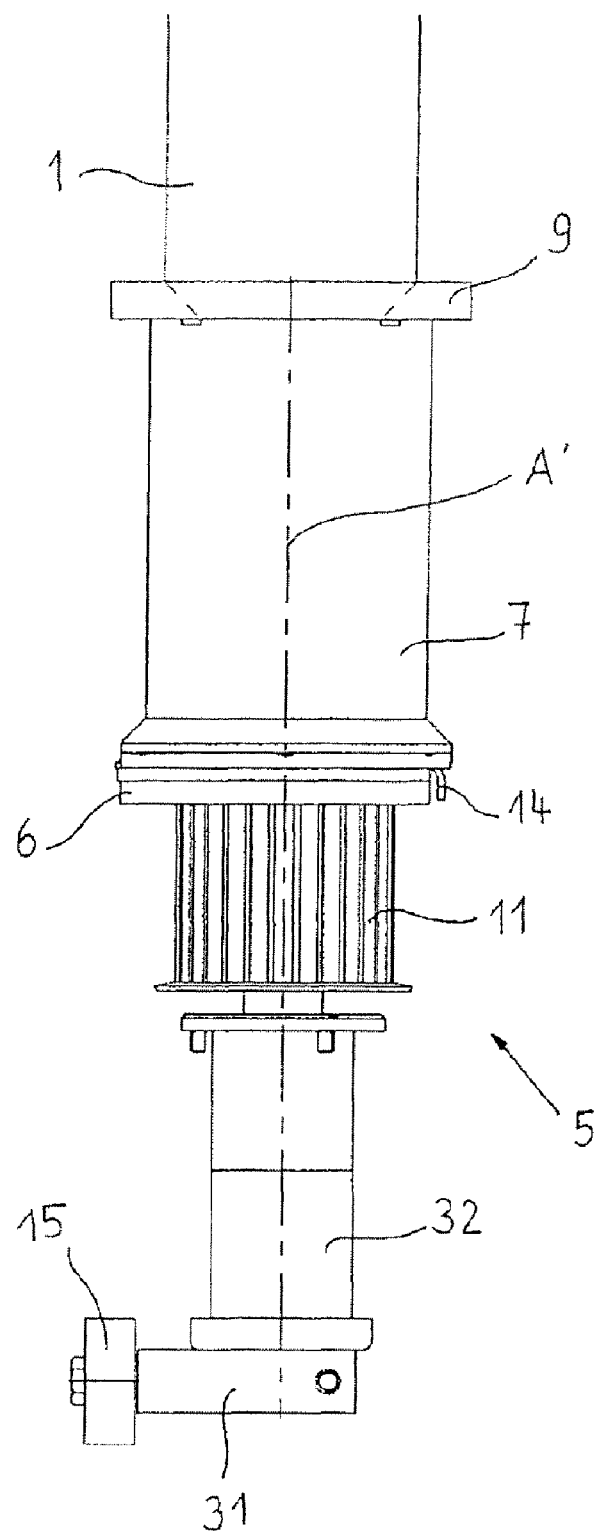
FIG. 2a a side view of a container support unit of a labeling device according to FIG. 1.
Figure 2B:
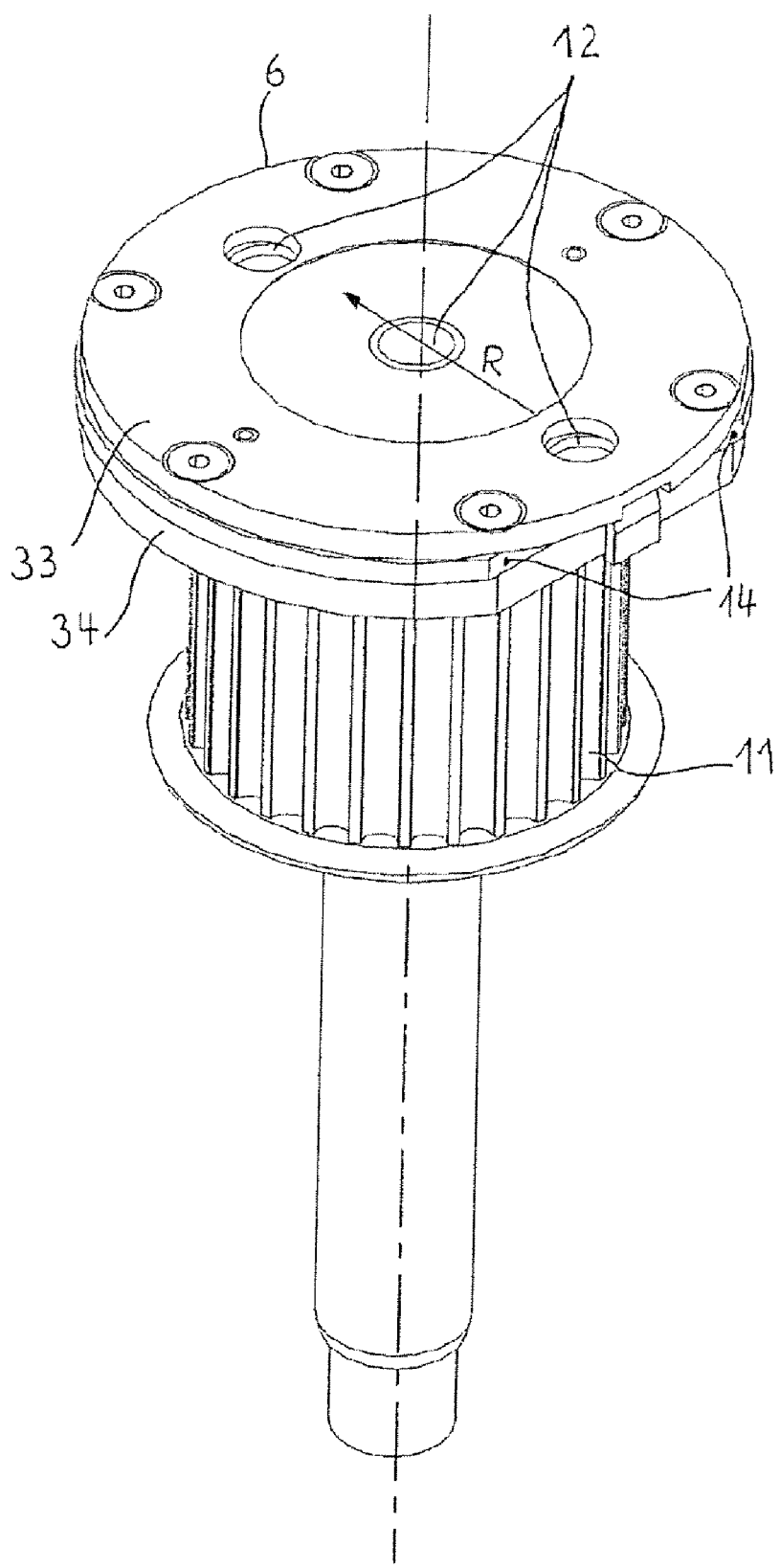
FIG. 2b a perspective view of a container support unit of a labeling device according to FIG. 1.

FIG. 2b shows a perspective view of the container support according to FIG. 2a, the container dish 7 and the lifting element 15 being absent for better viewing. This view reveals the function of the securing mechanism 14 which holds the container support 6 and the container dish 7 together. The container support 6 comprises, among other things, atop and bottom plates 33, 34. These are each provided with centering elements 12, which are located concentrically one above the other. A securing mechanism 14 is located between the top and bottom plates 33, 34. The securing mechanism 14 comprises the same centering elements 12 as the top and bottom plates 33, 34, though not concentric in the rest position but rather with the midpoint of the centering element 12 shifted opposite to direction R. Actuating the securing mechanism 14 causes it to move in direction R, whereby the centering elements 12 of the securing mechanism are brought into a concentric position with the centering elements 12 of the top and bottom plates 33, 34 respectively. In this position, a container dish 7 can be set onto the container support 6.

Figure 3A:
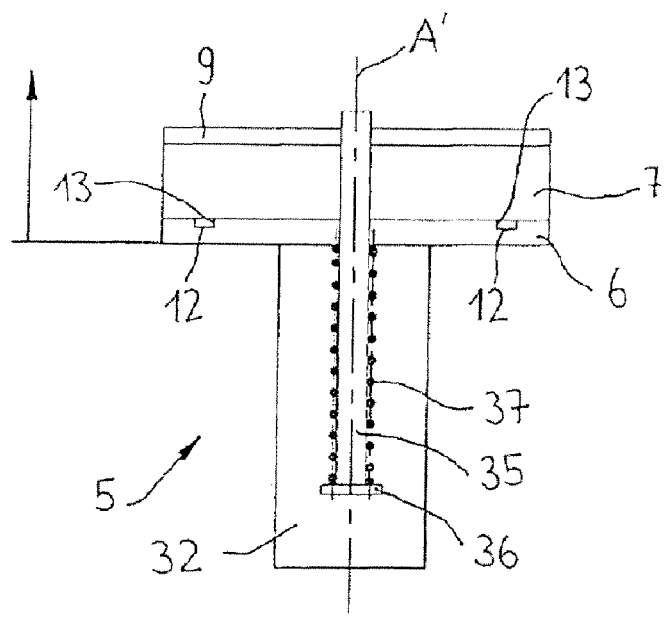
FIG. 3a a side view of a container support.
Figure 3B:
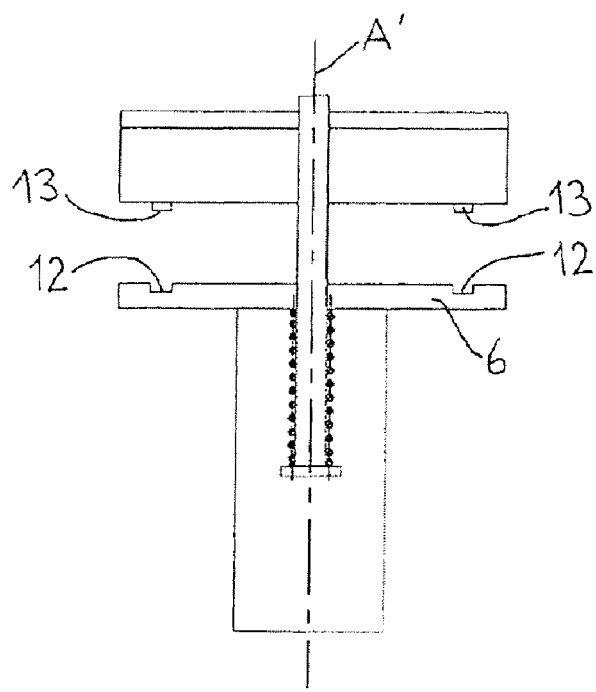
FIG. 3b a side view of a container support in the open position ready for insertion of a spacer.
Figure 3C:
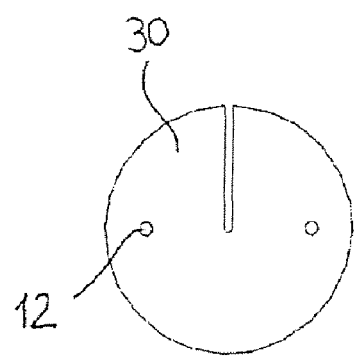
FIG. 3c plan view of a spacer.

FIG. 3 shows another embodiment of the vertical adjustability of the container support unit 5. A central rod 35 is provided in the bearing unit 32, on the bottom end of which is located an end 36. A spring 37 is installed around the central rod 35 between the end piece 36 and container support 6. If the container dish 7 with the container centering means 9 attached thereto is moved upward along the longitudinal axis of the container support unit A', the central rod 35 with the end piece 36 will move upward, so that the spring 37 is compressed. A spacer 30 can be inserted into the free space created by this. The spacer 30 comprises centering elements 12 and mating pieces 13, whereby the mating pieces 13 of the centering element 30 engage the centering elements 12 of the container support.

Figure 4:
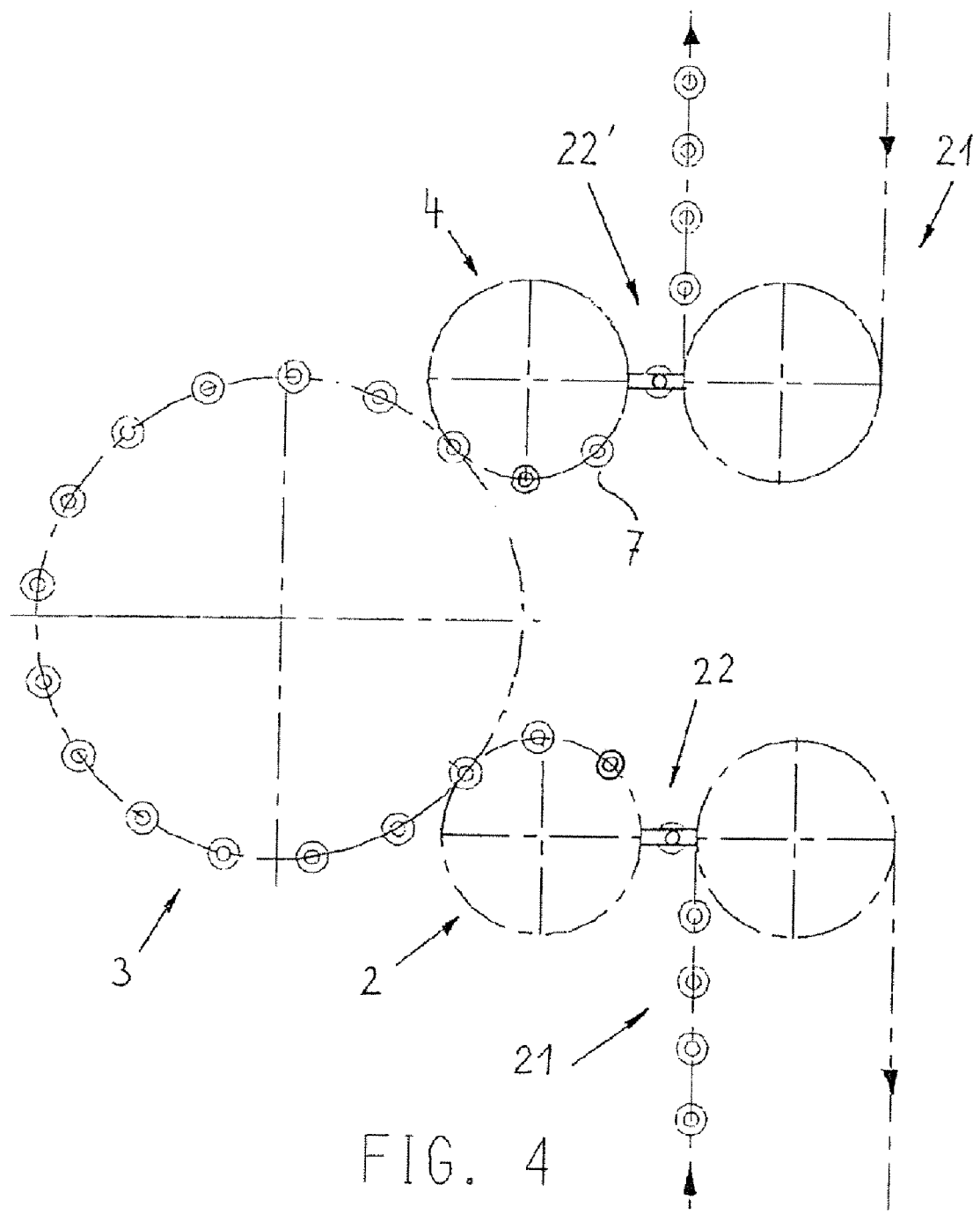
FIG. 4 a schematic plan view of a container conveyance device, a container feed means, a processing track, a container removal means and a second container conveyance device.

FIG. 4 shows a plan view of a device for labeling bottles, wherein the bottles 1 are conveyed by container conveyance device 21 in the direction of the transfer section 22. The bottles 1 are held clamped in the container conveyance device 21. In a gripper, not shown here, in the transfer section 22, the container 1 is transferred from the clamps of the container conveyance device 21 to the clamps of the input star wheel 2. The container 1 is thereby gripped above and below the support ring 1a. The container feed means 2 feeds the container 1 in the direction of the support frame 3, where it is then placed onto the container dish 7. Processing of the bottle 1 takes place in the section of the support frame 3 between the input star wheel 2 and the output star wheel 4. While the bottle 1 is being moved through the processing section, it is held clamped by a centering bell, not shown here, and the container dish 7. After processing, the bottles are transferred to the output star wheel 4. This transfer takes place in such a way that the output star wheel, equipped with the grippers 16, grips the bottle below the lip 1a. The output star wheel 4, which turns counterclockwise, transports the bottle 1 in the direction of the transfer section 22', where it is transferred onto a chain equipped with grippers 16 of the container conveyance device 21 and is transported away.

Figure 5:
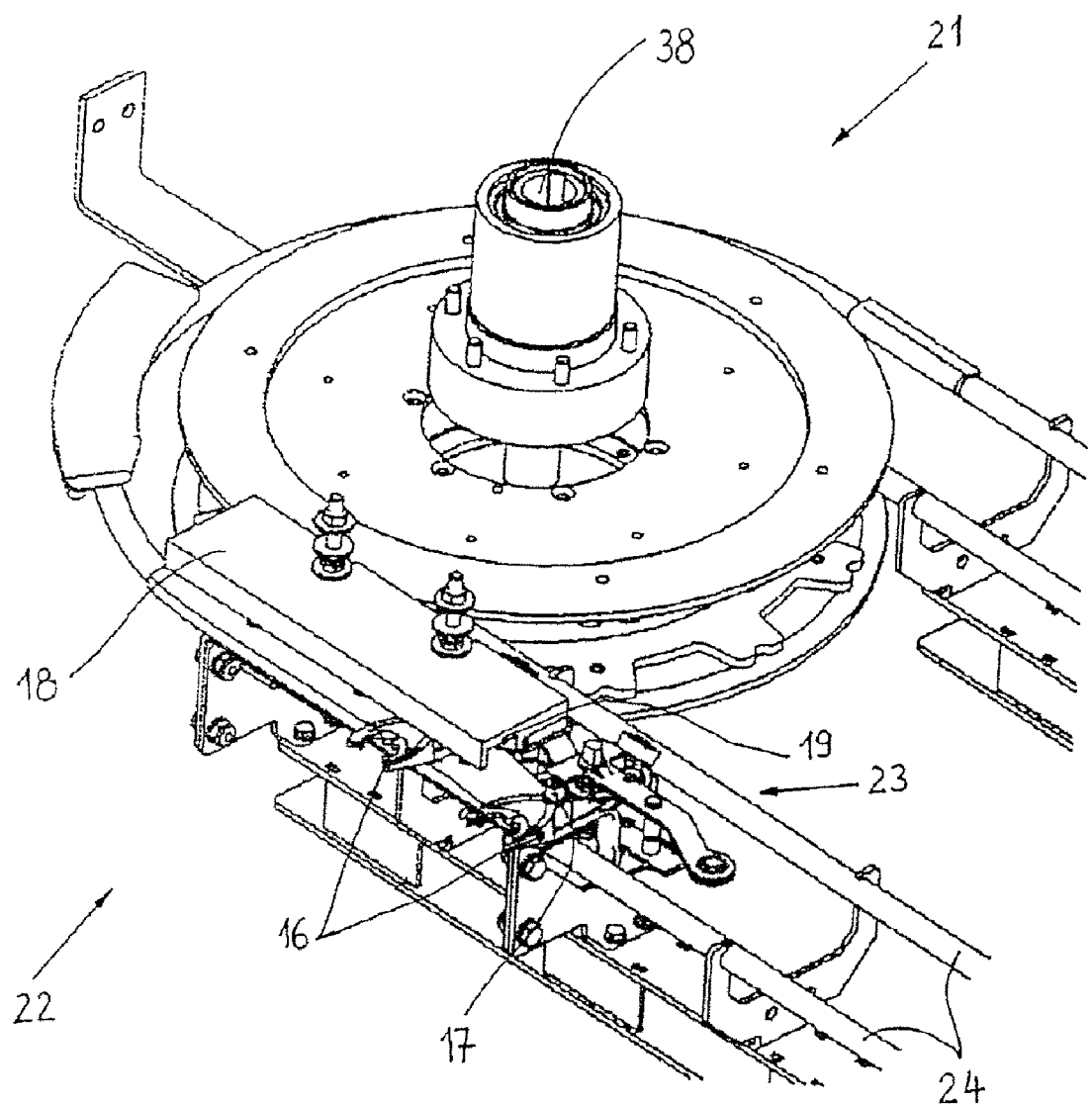
FIG. 5 perspective view of a container conveyance device with transfer section.

FIG. 5 shows a perspective view of a container conveyance device 21 as it was used twice according to FIG. 4. The container conveyance device 21 comprises a wheel which turns about an axis 38 and on which rotates a chain 23, running in two guides 24. Grippers 16 which are able to grip the bottles by their lips 1a are attached to the chain 23. The grippers 16 further comprise stabilizers 17, which stabilize the relatively instable chain 23 in a transfer section 22. To this end, provided in the transfer section 22 a guide track 18 comprising a guide groove 19, which the stabilizers 17 enter when moving through the transfer section 22. In this way, the relatively labile chain 23 is stabilized in the transfer region 22, so that precise transfer of the bottle 1 from the gripper 16 of the chain 23 into the gripper 16, not illustrated here, of the input star wheel 2 or star wheel 4 can be effected.

Figure 6:
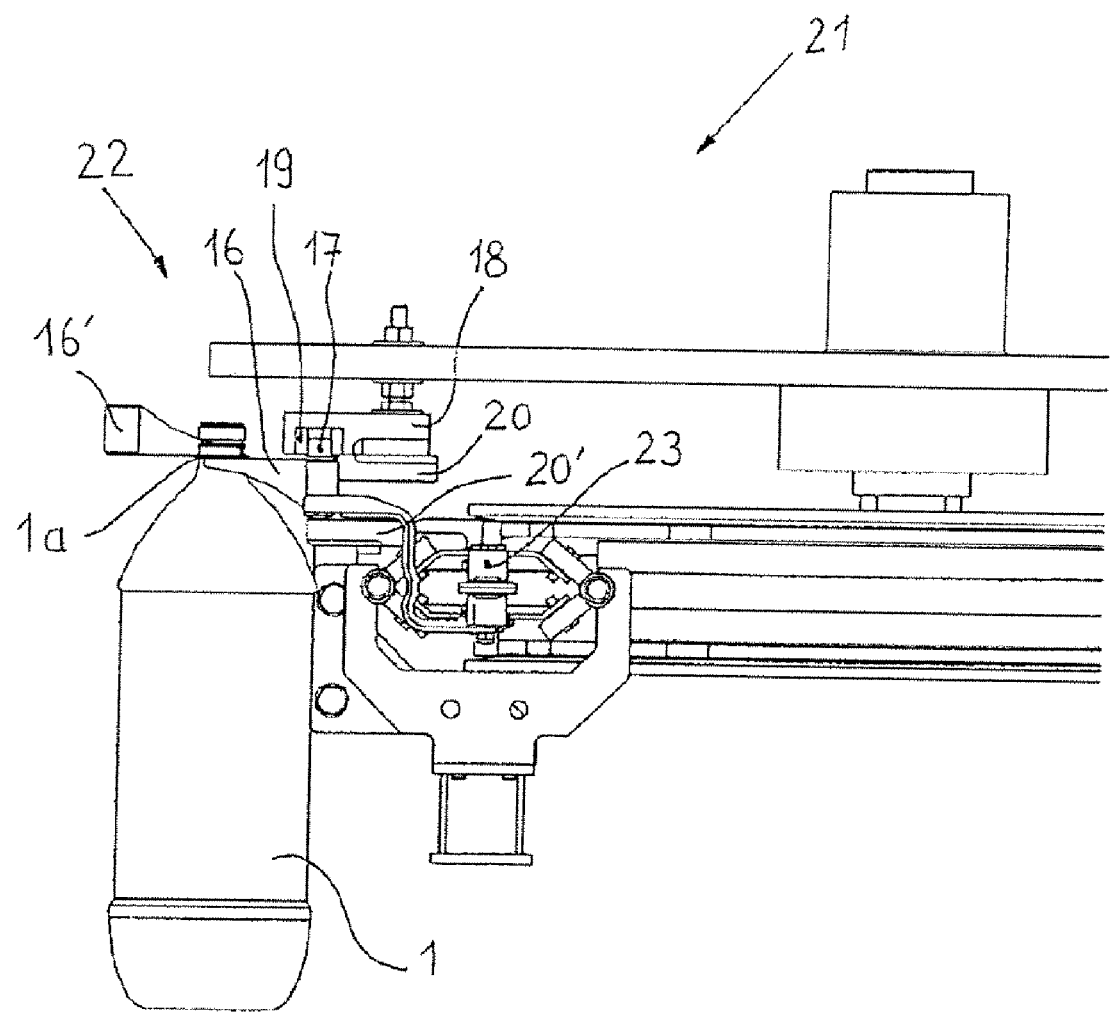
FIG. 6 a side view of a container conveyance device with transfer section according to FIG. 5.

FIG. 6 shows a cross-section through a container conveyance device 21. It can be clearly seen that the chain 23 comprises a retaining bracket, which supports a clamp 16. It can also be seen that the stabilizer 17, which is located in the guide groove 19, is additionally held by a supporting element 20 from behind and by a supporting element 20' from below. This allows for precise guidance of the chain in the transfer section 22.

FIG. 6 also shows a gripper 16' as it can be attached to an input star wheel 2 or output star wheel 4, which are not shown here. In the transfer section 22, the bottle 1, which is held by the gripper 16 below the lip 1a, is transferred to the gripper 16' which accepts the bottle above the lip 1a.

The invention claimed is:

1. Device for processing containers comprising a lip, with a container feed means, a support frame which rotates at a fixed height about a machine axis (M) parallel to a conveyance plane (N), a container removal means, multiple container support units mounted at regular intervals on the rotating support frame, the container support units each comprising at least a container support and a container dish, wherein container dishes of different heights are placed onto the container support, wherein the containers can be clamped between a container dish and a centering bell, wherein the container feed means and the container removal means are arranged at a fixed height and the conveyance height of the containers with respect to the conveyance plane (N) during conveyance through the device is not changeable, and wherein the distance from the container support unit to the conveyance plane (N) is changeable through variation of the overall height of the container support unit to compensate for the different container heights.

2. Device for processing containers according to claim 1, and spacers inserted between the container support and the container dish.

3. Device for processing containers according to claim 1, wherein container supports of different heights can be used.

4. Device for processing containers according to claim 1, wherein the container support unit consists of the container support, the container dish and a container centering means which at least partially grips the contour of the container.

5. Device according to claim 4, wherein container centering means of different height are placed onto the container dish.

6. Device according to claim 1, wherein the container feed means is an input star wheel.

7. Device according to claim 1, wherein the container removal means is an output star wheel.

8. Device for processing containers according to claim 1, wherein the containers to be processed are PET bottles with a lip.

9. Device according to claim 8, wherein the containers to be processed can be gripped by the input star wheel and by the output star wheel by means of a ripping element one of above or below the lip.

10. Device according to claim 1, wherein the container support units are movable relative to the support frame in the direction of the longitudinal axis of the container support unit (A').

11. Device according to claim 10, wherein the movement of the container support unit in the direction of the longitudinal axis of the container support unit (A') can be effected by means of a lifting cam.

12. Device according to claim 10, wherein the movement of the container support unit in the direction of the longitudinal axis of the container support unit (A') can be effected by one of a pneumatic cylinder, a hydraulic cylinder, or combination thereof.

13. Device according to claim 1, wherein the centering bell is movable relative to the support frame in the direction of the longitudinal axis of the container support unit (A').

14. Device according to claim 1, wherein the container support units are installed in the support frame so as to be rotatable about their own longitudinal axis (A').

15. Device according to claim 1, wherein the container support units comprise a means for transmitting rotational movement about their own longitudinal axis (A').

16. Device according to claim 1, wherein the means for transmitting rotational movement to the support frame includes gears.

17. Device according to claim 1, wherein the means for transmitting rotational movement to the support frame includes servo motors.

18. Device according to claim 17, wherein each container support unit has its own servo motor.

19. Device according to claim 1, wherein each container support comprises at least one centering element capable of accepting a mating piece located on the container dish.

20. Device according to claim 19, wherein each container support comprises multiple centering elements arranged so as to allow proper positioning of the container dish on the container support.

21. Container support unit, comprising at least a container support and a container dish, wherein the container support unit can be varied in terms of overall height and to compensate for the different container heights, and wherein the overall height can be varied by placing container dishes of different heights on the container support.

22. Container support unit according to claim 21, wherein the overall height can be varied by inserting at least one spacer between the container support and container dish.

23. Container support unit according to claim 21, having at least the container support, the container dish and a container centering means, and wherein the container centering means at least partially grips the contour of the container.

24. Container support unit according to claim 23, wherein the overall height of the container support unit is varied by placing container centering means of different height on the container dish.

25. Container support unit according to claim 23, wherein the container centering means is detachably secured to the container dish.

26. Container support unit according to claim 21, wherein the overall height of the container support unit is varied by placing multiple container dishes on top of each other.

27. Container support unit according to claim 21, wherein each container support comprises at least one centering element which can work in cooperation with a mating piece located on the container dish.

28. Container support unit according to claim 21, wherein each container support has multiple centering elements installed so as to allow precise positioning of the container dish on the container support.

29. Container support unit according to claim 21, wherein one of the container support and at least one of the container dishes comprises a securing mechanism to protect against unintended separation of the container dish from the container support.

30. Container support unit according to claim 21, wherein the securing mechanism is a quick release connection.

31. Container support unit according to claim 21, wherein the container support comprises at least one means for transmitting rotational movement.

32. Container support unit according to claim 31, wherein the means for transmitting rotation movement is a gear.

33. Container support unit according to claim 31, wherein the means for transmitting rotational movement is a servo motor.

34. Container support unit according to claim 21, and at least one lifting element which allows vertical adjustment of the container support unit in the direction of the longitudinal axis of the container support unit (A').

35. Container support unit according to claim 21, wherein the lifting element is at least one roller which can be brought into engagement with a lifting cam.

36. Container support unit according to claim 35, the lifting element is a cylinder.

37. Container support unit according to claim 21, wherein the container support unit is mounted at regular intervals on a rotating support frame, and wherein a container is inserted into the container support unit by a container feed means and the container is removed from the container support unit by a container removal means.

38. Method for labeling containers with a lip, comprising using a container feed means, rotating a support frame at a fixed height about a machine axis (M) parallel to a conveyance plane (N), providing a container removal means, providing multiple container support units at regular intervals on the rotating support frame, providing container support units each comprising at least a container support and a container dish, clamping the containers between a container support unit and a centering bell at least during part of their conveyance along a processing track moving along the support frame, arranging the container feed means and the container removal means at a fixed height wherein the containers do not change in their conveyance height with respect to the conveyance plane (N), and varying the distance from the conveyance plane (N) to the container support unit by changing the overall height of the container support unit by exchanging the container dishes to compensate for the different container heights to be processed.

39. Method for labeling containers according to claim 38, and varying the distance from the conveyance plane (N) to the container support unit by exchanging the container support.

40. Method for labeling containers according to claim 38, and varying the distance from the conveyance plane (N) to the container support unit by exchanging the container support unit.

41. Method for labeling containers according to claim 38, and varying the distance from the conveyance plane (N) to the container support unit by inserting spacers between the container support and the container dish.

42. Method for labeling containers according to claim 38, and varying the distance from the conveyance plane (N) to the container support unit by placing spacers onto the container dish.

43. Method for labeling containers according to claim 38, and varying the distance from the conveyance plane (N) to the container support unit by placing at least one container centering means onto the container dish.

44. Method for labeling containers according to claim 38, and gripping the container in clamping fashion during transfer from the container feed means to the container support unit by the centering bell moving downward with respect to the longitudinal axis of the container support unit (A') in the direction of the support frame while the container support unit moving upward with respect to the longitudinal axis of the container support unit (A') in the direction of the centering bell.

45. Method for labeling containers according to claim 38, and bringing the container feed means out of engagement with the container once the container is held in clamping fashion by the centering bell and the container support unit.

46. Method for labeling containers according to claim 38, and turning the container about its longitudinal axis (A) during the labeling process along the processing track.

47. Method for labeling containers according to claim 38, and transferring the container to the container removal means at the end of the processing track.

48. Method for labeling containers according to claim 39, and moving the centering bell and the container support unit upward and downward respectively along the longitudinal axis of the container support unit (A') after the transfer of the container to the container removal means, thereby releasing the container.

49. Method for labeling containers according to claim 38, wherein the container is a plastic container with a lip.

50. Method for labeling containers according to claim 38, wherein the container feed means and the container removal means are an input star wheel and an output star wheel.

51. Method for labeling containers according to claim 38, wherein the input star wheel and the output star wheel are equipped with grippers, to grip the containers to be labeled at least by the lip.

52. Method for labeling containers according to claim 49, and moving the lip of the plastic container at a fixed height in the conveyance plane (N) during conveyance through the container feed means, the labeling device and the container removal means.

53. Method for labeling containers according to claim 50, wherein the containers held by the lip are transferred by a container conveyance device to the input star wheel.

54. Method for labeling containers according to claim 53, wherein the containers held by the lip are transferred from the container conveyance device to the processing track.

55. Method for labeling containers according to claim 53, wherein the containers held by the lip are transferred from the output star wheel onto the container conveyance device.

56. Method for labeling containers according to claim 53, wherein the containers held by the lip are transferred from the processing track onto the container conveyance device.

57. Container conveyance device for use in a device for processing containers with a neck, according to claim 6, wherein the containers can be gripped and conveyed by the lip, the container conveyance device is provided with grippers for containers, and the container conveyance device comprises stabilizers which can be brought into engagement with a guide track in a transfer section, wherein the conveyance plane (N) is not changeable during the process.

58. Container conveyance device according to claim 57, wherein the stabilizers are pins which engage with a guide groove of the guide track.

59. Container conveyance device according to claim 57, wherein the containers are transferred in the transfer section from the container conveyance device to an input star wheel.

60. Container conveyance device according to claim 57, wherein the containers are transferred in the transfer section from an output star wheel to the container conveyance device.

61. Container conveyance device according to claim 57, wherein the containers are transferred in the transfer section from the container conveyance device to a support frame equipped with container support units at regular intervals.

62. Container conveyance device according to claim 57, wherein the containers are transferred in the transfer section from a support frame equipped with container support units at regular intervals to the container conveyance device.

63. Container conveyance device according to claim 57, wherein the grippers are attached to a chain which rotates endlessly about an axis.

64. Container support unit according to claim 36, wherein the cylinder is one of a pneumatic cylinder and a hydraulic cylinder.

65. Device for processing containers comprising a lip, with a container feed means. a support frame which rotates at a fixed height about a machine axis (M) parallel to a conveyance plane (N), a container removal means, multiple container support units mounted at regular intervals on the rotating support frame, the container support units each comprising at least a container support and a container dish, wherein the containers can be clamped between a container dish and a centering bell, wherein the container feed means and the container removal means are arranged at a fixed height and the conveyance height of the containers with respect to the conveyance plane (N) during conveyance through the device is not changeable, and wherein the distance from the container support unit to the conveyance plane (N) is changeable through variation of the overall height of the container support unit to compensate for the different container heights, wherein the container feed means is an input star wheel, and wherein the containers can be gripped and conveyed by the lip, and wherein a container conveyance device is provided with grippers for containers, and the container conveyance device comprises stabilizers which can be brought into engagement with a guide track in a transfer section, wherein the conveyance plane (N) is not changable during the process.

66. Container support unit, comprising at least a container support and a container dish, wherein the container support unit can be varied in terms of overall height and to compensate for the different container heights, and wherein the overall height of the container support unit is varied by placing multiple container dishes on top of each other.

67. Container support unit according to claim 66, wherein the overall height of the container support unit is varied by placing container centering means of different height on one of the multiple container dishes.

* * * * *